United States Patent [19]

Tatina

[11] 4,273,486
[45] Jun. 16, 1981

[54] WINCH AND CHAIN ATTACHMENT ASSEMBLY

[75] Inventor: Richard A. Tatina, Bridgeview, Ill.

[73] Assignee: Portec, Inc., Oak Brook, Ill.

[21] Appl. No.: 801,621

[22] Filed: May 31, 1977

[51] Int. Cl.³ .................. B60P 7/08; B61D 45/00; B65D 63/00; B66D 1/00
[52] U.S. Cl. .................. 410/103; 24/68 CT; 24/116 R; 59/95; 242/125; 254/221; 254/372; 403/361; 410/12; 410/100; 410/104
[58] Field of Search .................. 105/368 T, 477; 108/55.1, 55.3; 209/335; 220/1.5; 248/119 R, 499, 500, 503; 254/161, 164, 165, 217, 218, 221, 369, 371, 372, 373; 280/179 A; 24/68 CD, 68 CT, 116 R; 59/93; 242/125, 125.1; 403/12, 20, 21, 361; 410/12, 100, 103

[56] References Cited

U.S. PATENT DOCUMENTS

| 2,225,845 | 12/1940 | Richolt | 242/125.1 |
| 3,158,108 | 11/1964 | Sharp | 254/164 X |
| 3,507,471 | 4/1970 | Haynes, Jr. et al. | 410/103 |
| 3,564,577 | 2/1971 | Blunden et al. | 105/477 |
| 3,566,804 | 3/1971 | Mietla | 105/477 |
| 3,650,222 | 3/1972 | Broling et al. | 410/12 |
| 3,673,969 | 7/1972 | Peisner et al. | 105/368 T X |
| 3,715,994 | 2/1973 | Mietla | 410/12 |
| 3,827,662 | 8/1974 | Krokos | 410/12 |
| 3,841,235 | 10/1974 | Wheeler et al. | 105/368 T |
| 4,143,600 | 3/1979 | Hlinsky | 410/7 |
| 4,229,131 | 10/1980 | Hague | 410/103 X |

*Primary Examiner*—Randolph A. Reese
*Assistant Examiner*—Howard Beltran
*Attorney, Agent, or Firm*—Hill, Van Santen, Steadman, Chiara & Simpson

[57] ABSTRACT

Low-height reversible ratchet tie-down winch for flat decked vehicles. The tie-down winches are adjustably mounted in retainer channels extending along each side of the deck of the vehicle. Each winch is rotatably mounted between the top and bottom walls of its base and tension of the tie-down chain is maintained by a pawl and ratchet. The winch block has a chain pocket to lock a horizontal link of the chain to the chain pocket and a recessed portion engaging a next adjacent vertical link of the chain. The ratchet has a cooperating pocket engageable with a next adjacent vertical link of the chain and completing the chain pocket in the winch block. The chain may be trained through one end or the other of the base for the winch.

5 Claims, 8 Drawing Figures

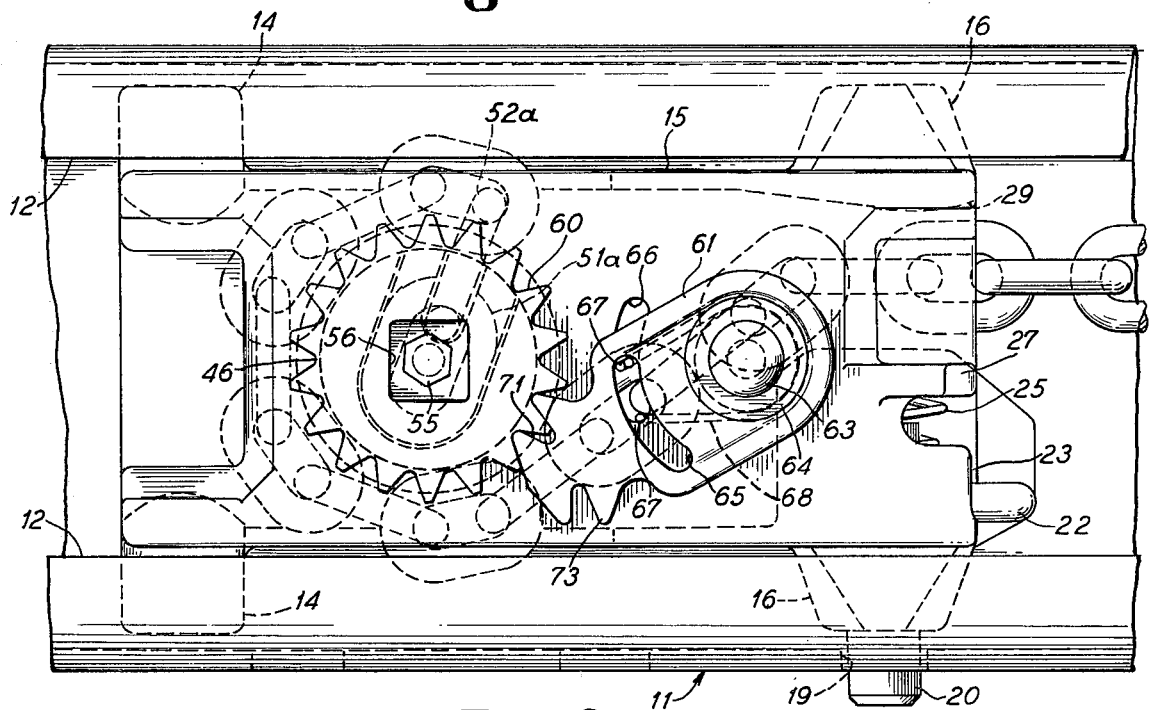
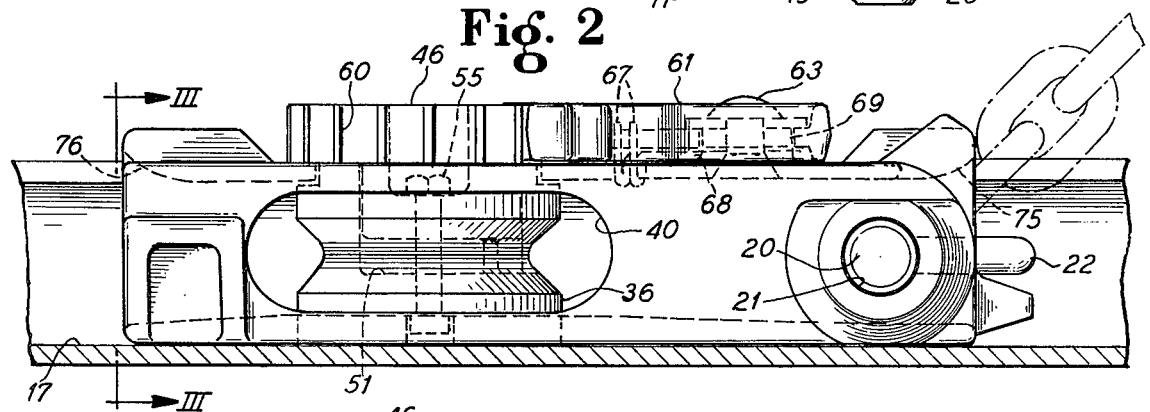
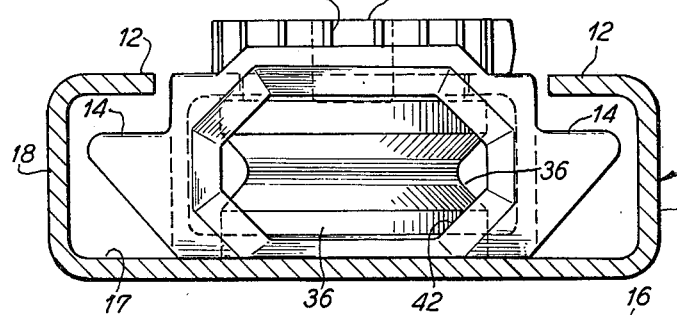
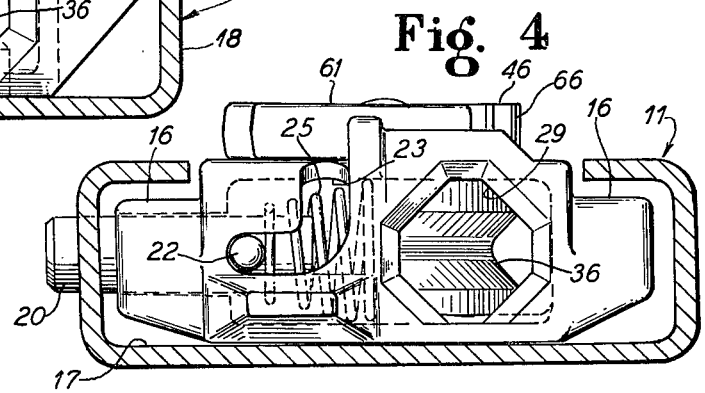

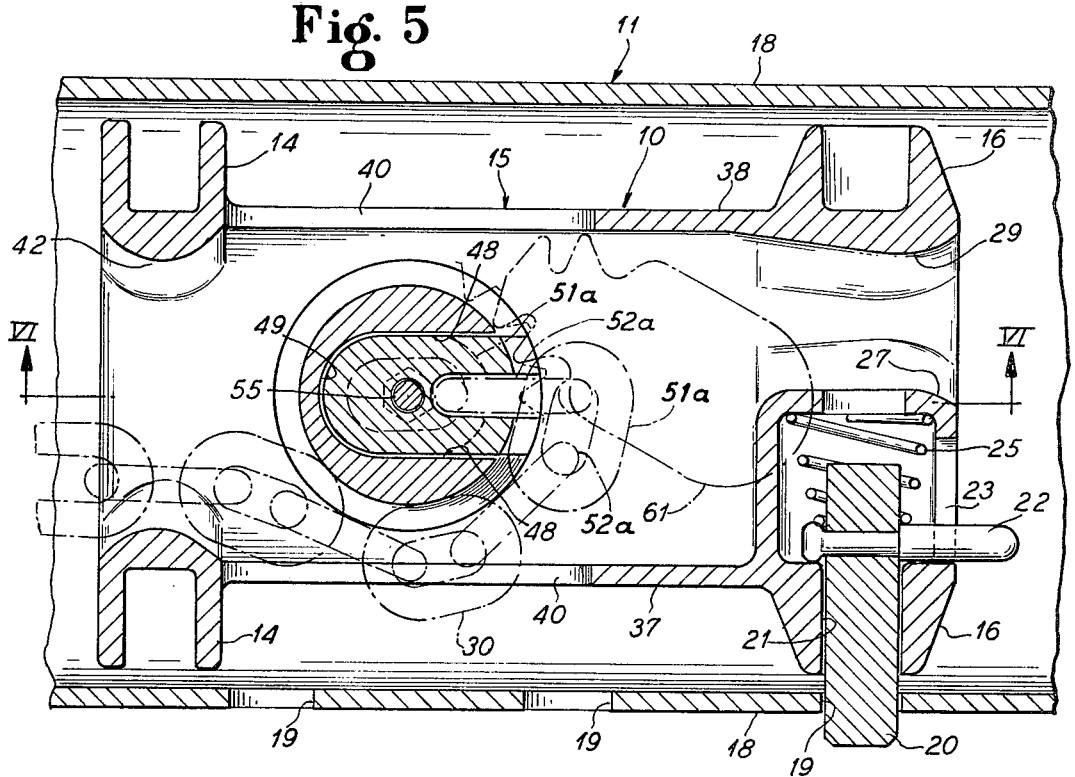
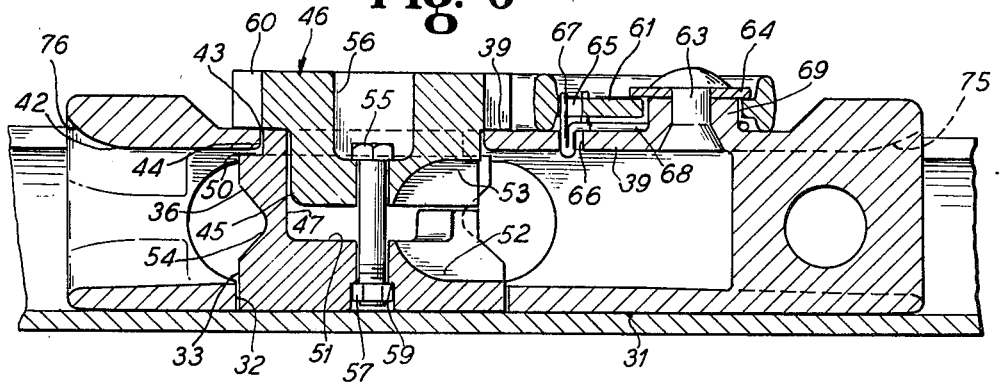
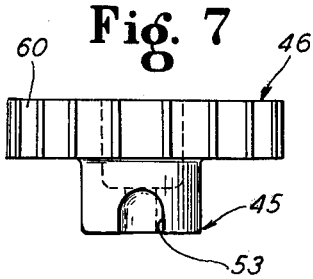
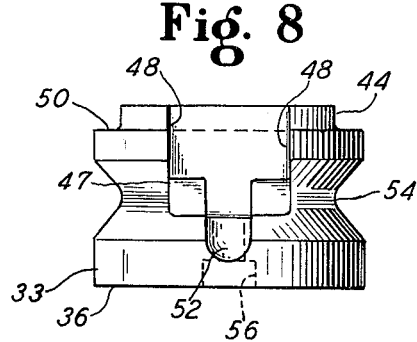

WINCH AND CHAIN ATTACHMENT ASSEMBLY

PRIOR ART

U.S. Pat. No. 3,650,222, assigned to applicant's assignee, and U.S. Pat. Nos. 3,507,471 and 3,715,994 show low-profile tie-down winches. The present tie-down winch is an improvement over the foregoing prior art tie-down winches, in the means for retaining the chain to a chain pocket by cooperation of the ratchet, and the reversibility of the winch by the use of a single pawl and ratchet, as well as the arrangement of the base accommodating the chain to be trained to the chain pocket from either end of the base.

SUMMARY AND ADVANTAGES OF INVENTION

Low-height tie-down winch adapted for tying down cargo on the flat deck of a cargo-carrying vehicle including a vertical axis winch block or capstan arranged to positively retain a tie-down chain to a winch block and take up tension thereon and accommodate the tie-down chain to be payed-off of a selected end of the winch block by removing the ratchet for the winch block and training the tie-down chain from a selected end of the winch block. The ratchet serves to cooperate with the winch block and retain the chain and winch block in selected take-up increments. A spring-biased pawl retains the winch block in its take-up position to maintain tension on the chain and to accommodate tension on the tie-down chain to be readily taken up.

One of the principal advantages of the present invention is the simplicity of the tie-down and chain ratchet and in the tunnels opening to each end of the base for the tie-down accommodating the chain to be payed-off either end of its base.

A further advantage of the invention is in the chain pocket in the winch closed by a ratchet and the simplified means for retaining the chain to the chain pocket and releasing the chain to be payed-off in a preselected direction.

A still further advantage of the invention is in the compactness of the tie-down, taking up less vertical height than previous tie-downs and in the simplicity in reversing the direction in which the chain may extend from the base for the winch.

Other advantages, objects and features of the invention will be readily apparent from the following description of a certain preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a top plan view of a winch block constructed in accordance with the principles of the present invention, with the winch block locked in position in a retaining channel extending along the deck of a vehicle and showing the tie-down chain payed-off one end of the base for the tie-down;

FIG. 2 is a view in side elevation of the tie-down shown in FIG. 1;

FIG. 3 is an end view of the tie-down looking at the tiedown substantially along line III—III of FIG. 2;

FIG. 4 is an opposite end view of the tie-down showing the tie-down locked in position in its channel and the tie-down chain removed;

FIG. 5 is a horizontal sectional view taken through the tie-down and channel showing the tie-down chain payed-off of the opposite end of the tie-down base from that shown in FIG. 1;

FIG. 6 is a longitudinal sectional view taken substantially along line VI—VI of FIG. 5, with the locking pin removed;

FIG. 7 is a view in side elevation of the ratchet showing part of the chain pocket; and FIG. 8 is a view in side elevation of the winch block showing the chain pocket for the first or end horizontal link of the chain and portion of the chain pocket for the next adjacent vertical link of the chain.

DESCRIPTION OF PREFERRED EMBODIMENT OF INVENTION

I have shown in FIGS. 1, 2, 3 and 4 a low-profile tiedown winch constructed in accordance with the principles of the present invention and locked in position in a tie-down channel 11 extending along the deck of a cargo-carrying vehicle, which may be a railway flatcar, a flat deck trailer or a multiple-level rack car.

The tie-down channel 11 has inwardly extending flanges 12, the top surfaces of which may be above the flat deck of the vehicle. The flanges extend over retainer lugs 14, 14 extending from opposite sides of one end of a base 15 for the tie-down. Retainer lugs 16, 16 extending from opposite sides of the base 15 adjacent the opposite end thereof may also retain the base 15 to the channel 11 when adjustably moved along the channel.

The tie-down channel 11 has a flat web 17, parallel side walls 18, 18 extending vertically of said web and retainer flanges 12 extending inwardly therefrom. One side wall 18 is shown in FIG. 5 as having a plurality of uniformly spaced apertured portions 19 to receive a lock pin 20 extending through the lug 16, for locking the base in position in its channel. The lock pin 20 is slidably carried in an apertured portion 21 of the lug 16 for locking engagement with a selected apertured portion 19 in accordance with the desired position of the base and tiedown winch along the channel.

As shown in FIG. 5, the lock pin 20 has a release bar 22 extending laterally therethrough outwardly beyond the end of said base 15 and guided in a generally L-shaped slot 23, to accommodate release of the lock pin 20 and to limit outward movement of said lock pin. The release bar 22 may move the lock pin to a release position against a compression spring 25 engaging the release bar and biasing the lock pin into a locked position. The release bar guided along the L-shaped slot 23 may hold the pin 20 out of locking engagement with an apertured portion 19 in the side wall of the channel 11. The compression spring 25 extending about the lock release bar is shown in FIG. 5 as abutting a wall 27, the opposite end of which defines one side wall of a tunnel or opening 29, for training a tie-down chain 30 from the base 15 in one direction.

The base 15 of the tie-down winch 10 has a bottom wall 31 having a bored or apertured portion 32 for rotatably receiving a hub 33 of a winch block 36 and forming a bearing therefor.

The base also has side walls 37 and 38 extending upwardly therefrom and terminating in a top wall 39 generally parallel to the bottom 31. The side walls 37 and 38 each have an elongated opening 40 therein, to accommodate the chain 30 as wrapped about the winch block (FIGS. 1 and 5) in either direction of take-up of the chain. A tunnel 42 extends through the opposite end of the base 15 from the tunnel or opening 29 to accommodate the tie-down chain 30 to be trained therethrough to tie down a load and to react against the base when trained upwardly to a load.

The top wall 39 has a cylindrical apertured portion 43 forming a bearing for an inwardly spaced reduced diameter generally cylindrical portion 44 of the winch block 36. A ratchet 46 has a boss 45 depending therefrom to conform to a recess 47 in the winch block 36. The recess 47 is shown as having parallel side walls 48 and an arcuate back wall 49 to receive the depending boss 45 and accommodate the ratchet to hold the winch block 36 from rotation by pull on the chain 30 as tension is taken up and retained on the chain 30. The winch block 36 also has an upwardly facing shouldered portion 50 adapted to abut the underside of the top wall 39 as tension is taken up on the chain. The shouldered portion 50 terminates into the semi-cylindrical portion 44 extending upwardly of the upper end of the winch block through the cylindrical apertured portion 43 in the top wall 39 of the base.

The recess 47 in the winch block 36 has a lower end portion forming a chain pocket 51 for a horizontal end link of the chain and has a recessed portion 52 opening to its end forming the lower portion of a pocket 52 for the next adjacent vertical link of the chain. The boss 45 depending from the ratchet 46 also has the upper portion of a chain pocket 53 for the next adjacent vertical link of the chain and forming a continuation of the pocket 52. A groove 54 extends about said winch block, engaging the horizontal links of the chain when links 51a and 52a are retained to the pockets 51, 52 and 53.

The ratchet 46 is retained to the winch block 36 by suitable securing means, such as a bolt 55, the head of which abuts the bottom of a rectangular socket 56, adapted to receive a wrench or the like. The bolt 55 extends through the end horizontal link 51a of the chain. A nut 57, threaded on said bolt, is provided to accommodate tightening of said ratchet to said winch block. The nut 57 is shown in FIG. 6 as being recessed within the bottom of the winch block and as abutting a shouldered portion 59 of the recess for said nut. The recess for the nut 57 may be formed to conform to said nut, to accommodate tightening of the bolt by turning movement thereof from the head of the bolt. The ratchet 46 has ratchet teeth 60 extending thereabout and abutting the top of the top wall 39 to aid in retaining the winch block 36 to its bearings.

A pawl 61 is provided to engage the ratchet teeth 60 to accommodate ratcheting of said ratchet and hold said ratchet and the winch block 36 from rotation as tension is taken up on the chain 30. The pawl 61 is shown as being a reversible pawl to hold said ratchet and winch block in a selected direction, although it need not necessarily be reversible. The pawl 61 is shown in FIG. 1 as being pivoted to the top wall 39 of the base 15 adjacent the longitudinal center line of said base and at the end thereof adjacent the opening or tunnel 29 on a suitable pivot means, shown in FIGS. 2 and 6 as being a rivet 63. The head of said rivet abuts a washer 64 abutting the top of said reversible pawl.

The pawl 61 also has an arcuate slot 65 formed therein, the axis of which is struck from the axis of pivotal movement of said pawl and registering with an arcuate slot 66 formed in the top wall 39 of the base 15 and conforming to the form of the slot 65. The arcuate slot 65 is adapted to receive a down and up-turned end 67 of a torsion spring 68. The torsion spring 68 is shown as being generally U-shaped in form, the free ends of which are of a similar construction. Said torsion spring 68 extends about a boss 69 forming a mounting for the rivet 63, pivotally mounting the ratchet to said base. One free down and up-turned end 67 of the torsion spring 68 abuts one end of the slot 66 while the opposite free down and up-turned end 67 abuts the end of the slot 65, shown in FIG. 1 as being the right-hand end of said slot to bias pawl teeth 71 into engagement with the ratchet teeth 60, and as shown in FIG. 1, accommodate take-up movement of the ratchet and winch block in a clockwise direction and hold said ratchet and winch block from rotation in a counterclockwise direction. The pawl 61 also has pawl teeth 73 like the pawl teeth 71, but adapted to retain the ratchet from rotation in a clockwise direction, and to accommodate take-up rotation thereof in a counterclockwise direction, as shown in FIGS. 5 and 6.

When it is desired to reverse the direction of rotation of the ratchet 46 to pay the tie-down chain 30 out the tunnel 42 and accommodate take-up of the ratchet 46 and winch block 36 in a counterclockwise direction, but to hold said ratchet and winch block from rotation in a clockwise direction to maintain tension on the chain 30, it is merely necessary to remove the ratchet gear and position the pawl 61 in the position shown in FIG. 5 and then push the pawl to the position shown by broken lines in FIG. 5 and then reinstall the ratchet gear by tightening the bolt 55 on the nut 57. The up-turned ends 67 of the torsion spring 68 are engaged with opposite ends of the slots 65 and 66 from those shown in FIG. 1 to bias the pawl teeth 73 with the ratchet teeth 60 as shown in phantom in FIG. 5. The chain 30 may be trained through the tunnel 42 from the left-hand side of the base 15, or may be removed from the chain pockets out of the tunnel 29 and then be reinserted through the tunnel 42 into the registering chain pockets 51, 52 and 53 as the ratchet is replaced. The bolt 55 may then be tightened on the nut 57.

It thus should be understood that when the chain is to be trained from one end or the other from the base 15, it usually is removed from the base through one end thereof and replaced in the base and chain pocket through the opposite end thereof.

The torsion spring 68 thus maintains the pawl in positive engagement with the teeth of the ratchet and may do so regardless of the direction of rotation of the ratchet, provided the pawl is positioned in accordance with the desired rotation of the ratchet.

It should further be noted that with the take-up of the type disclosed, the take-up may be in the order of $\frac{1}{2}$" per increment of ratchet adjustment and the maximum chain take-up may be in the order of 9". It should be understood, however, that the take-up per increment of ratchet adjustment depends upon the diameter of the ratchet and size of the ratchet teeth, and may be varied in accordance with required take-up conditions, and that the ratchet and winch block may be so designed as to provide a maximum chain take-up of greater than 9" in accordance with the take-up requirements.

It should further be understood that the chain is retained in the winch block by the chain pocket and ratchet gear closing the chain pocket, and the bolt 55 and nut 57 unites the ratchet gear with the winch block and extends through the end horizontal link of the chain and thereby retains the chain to the chain pocket as well as keeping the chain pocket closed.

It should further be noted from FIGS. 2 and 4 that the tunnel 29 and the tunnel 42 each have top surfaces 75 and 76, respectively generally conforming to the angle the chain 30 will take when tying down cargo and transfer the tie-down force from the chain to the base.

I claim as my invention:

1. In a tie-down winch for tying cargo to the deck of a flat deck transporting vehicle, at least one channel extending longitudinally along the deck of the vehicle and having a web, parallel spaced side walls extending upwardly of said web, retainer flanges extending inwardly of said side walls, a tie-down winch carried in said channel and including a base frame having a bottom wall supported on the web of said channel for adjustable movement therealong and having parallel spaced side walls and a top wall, said top, bottom and side walls being integrally formed, at least one locking member carried by said base frame for movement relative to said base frame into interengagement with said channel to hold said base frame in position in said channel, a tie-down chain having horizontal and vertical links connected together and adapted to be connected to cargo on said flat deck, a vertical axis winch block mounted on said base frame between the top and bottom walls thereof and journalled in said top and bottom walls for take-up movement relative to said base frame, a ratchet having interengagement with said winch block, a pawl pivoted on said top wall of said base and having pawl teeth positionable to engage said ratchet and accommodate rotation of said ratchet and winch block in chain take-up increments and to hold said winch block from rotation as tension is taken up on said chain, and spring means resiliently retaining said pawl teeth in engagement with said ratchet, the improvement comprising, an upwardly opening chain pocket recessed in said winch block for an end horizontal link of a tie-down chain and a depending recessed portion extending from said chain pocket to the periphery of said winch block and forming a partial chain pocket for a next adjacent vertical link of said tie-down chain, said ratchet having a depending boss having interengagement with said block and having a vertically extending chain pocket registering with and completing said partial chain pocket in said winch block to receive a next adjacent vertical link of said tie-down chain and complete said partial chain pocket, and means accessible from the top of said winch for retaining said ratchet to said winch block and said tie-down chain to the chain pocket formed by said winch block and boss.

2. The tie-down winch of claim 1, in which said ratchet has an irregular socket therein opening to the top thereof, affording access to said retaining member and adapted to receive a wrench and the like to turn said ratchet and winch block to take-up on said chain.

3. The tie-down winch of claim 1, in which the winch block has vertically spaced generally cylindrical hub portions rotatably mounted in said top and bottom walls of said base frame, and the chain receiving groove is disposed between said hub portions and recessed in said winch block, and the a chain pocket for an end horizontal link of a tie-down chain opens to a partial chain pocket for a next adjacent vertical link of the chain in which the chain is retained to the winch block by a boss depending from the ratchet, and central clamping means retain the ratchet to the winch block.

4. The tie-down of claim 3, wherein the central clamping means retaining the ratchet to said winch block and the chain to said horizontal and vertical chain pockets comprises a bolt releasable from one side of said ratchet.

5. The tie-down winch of claim 4, in which the pawl is a reversible pawl engageable with said ratchet to accommodate the holding of said ratchet in a selected direction of rotation.

* * * * *